US012697989B2

(12) United States Patent
Miyake

(10) Patent No.: US 12,697,989 B2
(45) Date of Patent: Aug. 4, 2026

(54) VEHICLE DISPLAY CONTROL DEVICE, VEHICLE DISPLAY CONTROL SYSTEM, AND VEHICLE DISPLAY CONTROL METHOD

(71) Applicant: DENSO CORPORATION, Kariya-city (JP)

(72) Inventor: Yusuke Miyake, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 643 days.

(21) Appl. No.: 18/070,573

(22) Filed: Nov. 29, 2022

(65) Prior Publication Data

US 2023/0103715 A1     Apr. 6, 2023

Related U.S. Application Data

(63) Continuation of application No. PCT/JP2021/021495, filed on Jun. 7, 2021.

(30) Foreign Application Priority Data

Jul. 13, 2020     (JP) ................................. 2020-120107

(51) Int. Cl.
*B60W 50/14* (2020.01)
*B60K 35/10* (2024.01)
(Continued)

(52) U.S. Cl.
CPC ............. *B60W 50/14* (2013.01); *B60K 35/10* (2024.01); *B60K 35/22* (2024.01); *B60K 35/28* (2024.01); *B60K 35/29* (2024.01); *B60K 35/81* (2024.01); *B60K 2360/175* (2024.01); *B60W 2050/146* (2013.01)

(58) Field of Classification Search
CPC .......................... B60W 50/0098; B60W 40/08
See application file for complete search history.

(56) References Cited

U.S. PATENT DOCUMENTS

2009/0261957 A1   10/2009  Kido
2011/0046850 A1    2/2011  Kido
(Continued)

FOREIGN PATENT DOCUMENTS

JP        200752719 A      3/2007
JP        2018012478 A     1/2018
(Continued)

*Primary Examiner* — Imran K Mustafa

(74) *Attorney, Agent, or Firm* — Harness, Dickey & Pierce, P.L.C.

(57)                     ABSTRACT

A state identification unit identifies an automated driving related state, which is at least one of a traveling state of a vehicle related to an automated driving and a state of a driver of the vehicle. A passenger display control unit controls display on a second display provided to the vehicle and different from a first display exclusive for the driver. The second display is visible to a passenger of the vehicle other than the driver. A passenger request acquisition unit acquires a request from the passenger. The passenger display control unit causes the second display to display a passenger side graphic that indicates the automated driving related state, which is identified by the state identification unit, using at least one of a text and an image.

4 Claims, 6 Drawing Sheets

(51) Int. Cl.

| | |
|---|---|
| *B60K 35/22* | (2024.01) |
| *B60K 35/28* | (2024.01) |
| *B60K 35/29* | (2024.01) |
| *B60K 35/81* | (2024.01) |

(56) References Cited

U.S. PATENT DOCUMENTS

| | | | | |
|---|---|---|---|---|
| 2011/0291824 A1 | 12/2011 | Kido | | |
| 2011/0291917 A1 | 12/2011 | Kido | | |
| 2012/0296524 A1 | 11/2012 | Kido | | |
| 2013/0002412 A1 | 1/2013 | Kido | | |
| 2016/0082888 A1 | 3/2016 | Kothari | | |
| 2018/0297611 A1 | 10/2018 | Fujisawa et al. | | |
| 2020/0218442 A1* | 7/2020 | Shin | ...................... | G06F 18/256 |
| 2021/0061135 A1* | 3/2021 | Oikawa | ............. | B60H 1/00871 |
| 2021/0146943 A1* | 5/2021 | Oniwa | ................... | B60R 21/00 |

FOREIGN PATENT DOCUMENTS

| | | | |
|---|---|---|---|
| JP | 2019119338 A | 7/2019 |
| JP | 2019137179 A | 8/2019 |
| JP | 2019167094 A | 10/2019 |
| JP | 2020071415 A | 5/2020 |

* cited by examiner

FIG. 7

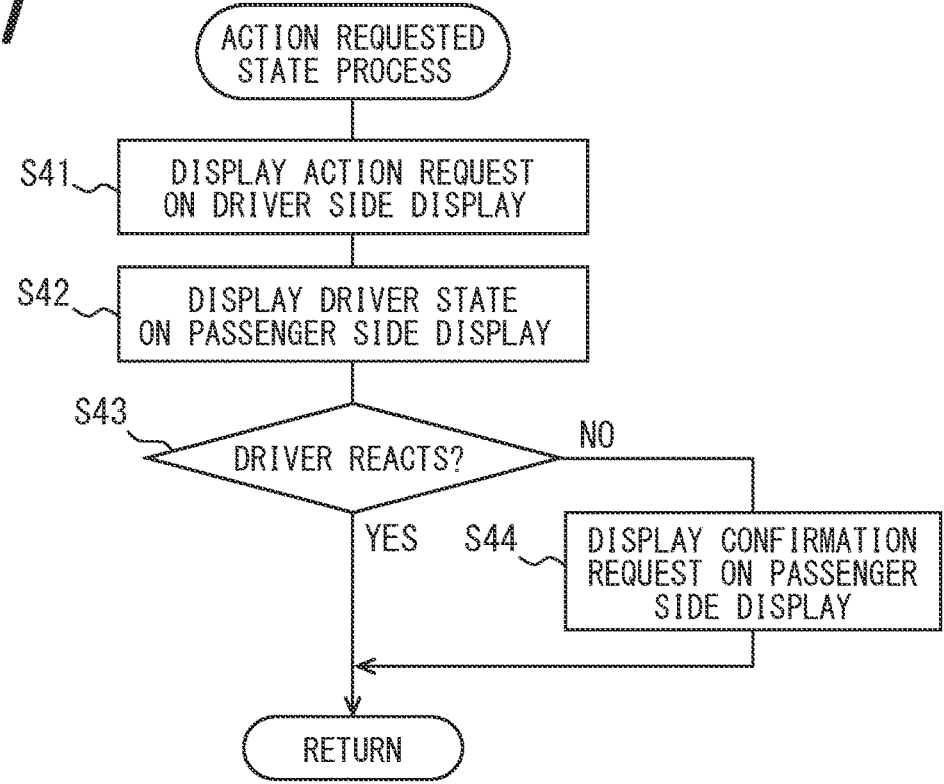

ACTION REQUESTED
STATE PROCESS

S41 — DISPLAY ACTION REQUEST
ON DRIVER SIDE DISPLAY

S42 — DISPLAY DRIVER STATE
ON PASSENGER SIDE DISPLAY

S43 — DRIVER REACTS?
NO
YES

S44 — DISPLAY CONFIRMATION
REQUEST ON PASSENGER
SIDE DISPLAY

RETURN

FIG. 8

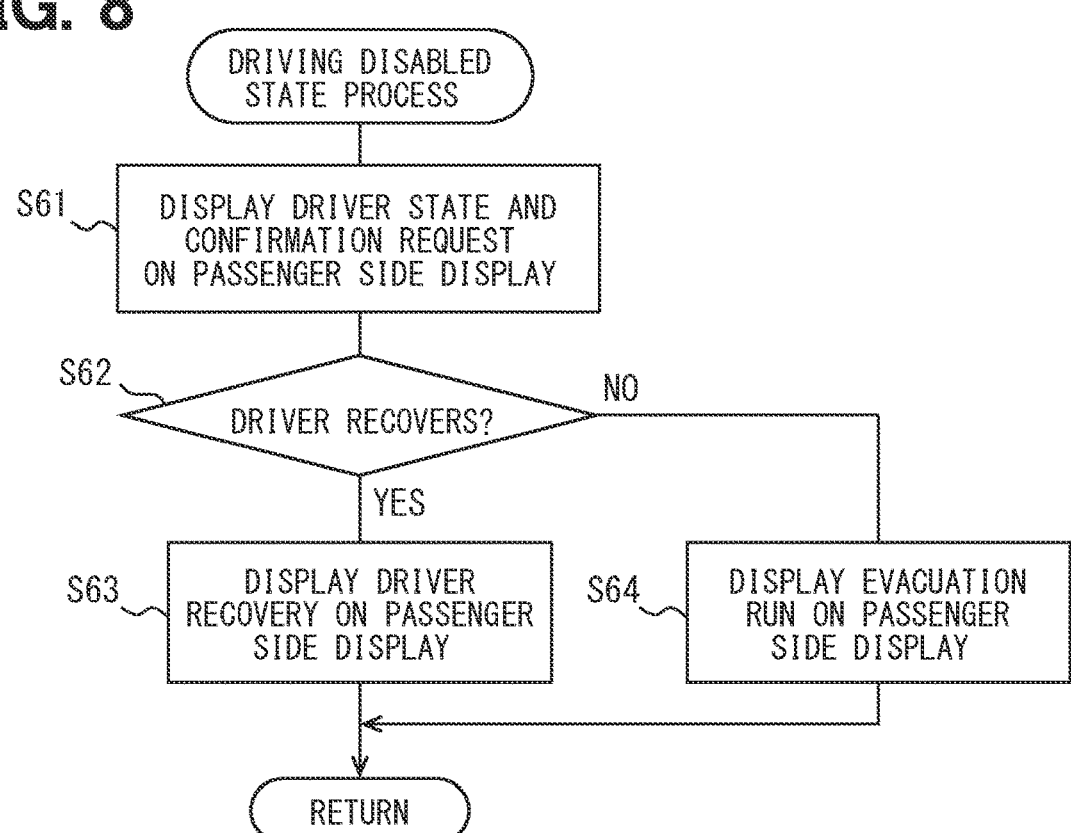

DRIVING DISABLED
STATE PROCESS

S61 — DISPLAY DRIVER STATE AND
CONFIRMATION REQUEST
ON PASSENGER SIDE DISPLAY

S62 — DRIVER RECOVERS?
NO
YES

S63 — DISPLAY DRIVER
RECOVERY ON PASSENGER
SIDE DISPLAY

S64 — DISPLAY EVACUATION
RUN ON PASSENGER
SIDE DISPLAY

RETURN

VEHICLE DISPLAY CONTROL DEVICE, VEHICLE DISPLAY CONTROL SYSTEM, AND VEHICLE DISPLAY CONTROL METHOD

CROSS REFERENCE TO RELATED APPLICATION

The present application is a continuation application of International Patent Application No. PCT/JP2021/021495 filed on Jun. 7, 2021, which designated the U.S. and claims the benefit of priority from Japanese Patent Application No. 2020-120107 filed on Jul. 13, 2020. The entire disclosures of all of the above applications are incorporated herein by reference.

TECHNICAL FIELD

The present disclosure relates to a vehicle display control device, a vehicle display control system, and a vehicle display control method.

BACKGROUND

A known automated driving system is configured to automatically control acceleration, deceleration, and/or steering of a vehicle.

SUMMARY

According to an aspect of the present disclosure, a vehicle display control device for a vehicle includes a state identification unit and a passenger display control unit. The state identification unit is configured to identify an automated driving related state, which is at least one of a traveling state of the vehicle related to the automated driving or a state of a driver of the vehicle. The passenger display control unit is configured to control display on a second display provided to the vehicle and different from a first display. The first display is provided to the vehicle and exclusive for the driver. The second display is visible to a passenger of the vehicle other than the driver. The passenger display control unit is configured to cause the second display to display a passenger side graphic that indicates the automated driving related state, which is identified by the state identification unit, using at least one of a text and an image.

BRIEF DESCRIPTION OF THE DRAWINGS

The above and other objects, features and advantages of the present disclosure will become more apparent from the following detailed description made with reference to the accompanying drawings. In the drawings:

FIG. 7 is a flow chart showing an example an action requested state process;

FIG. 8 is a flow chart showing an example of a driving disabled state process.

DETAILED DESCRIPTION

Figure 1:
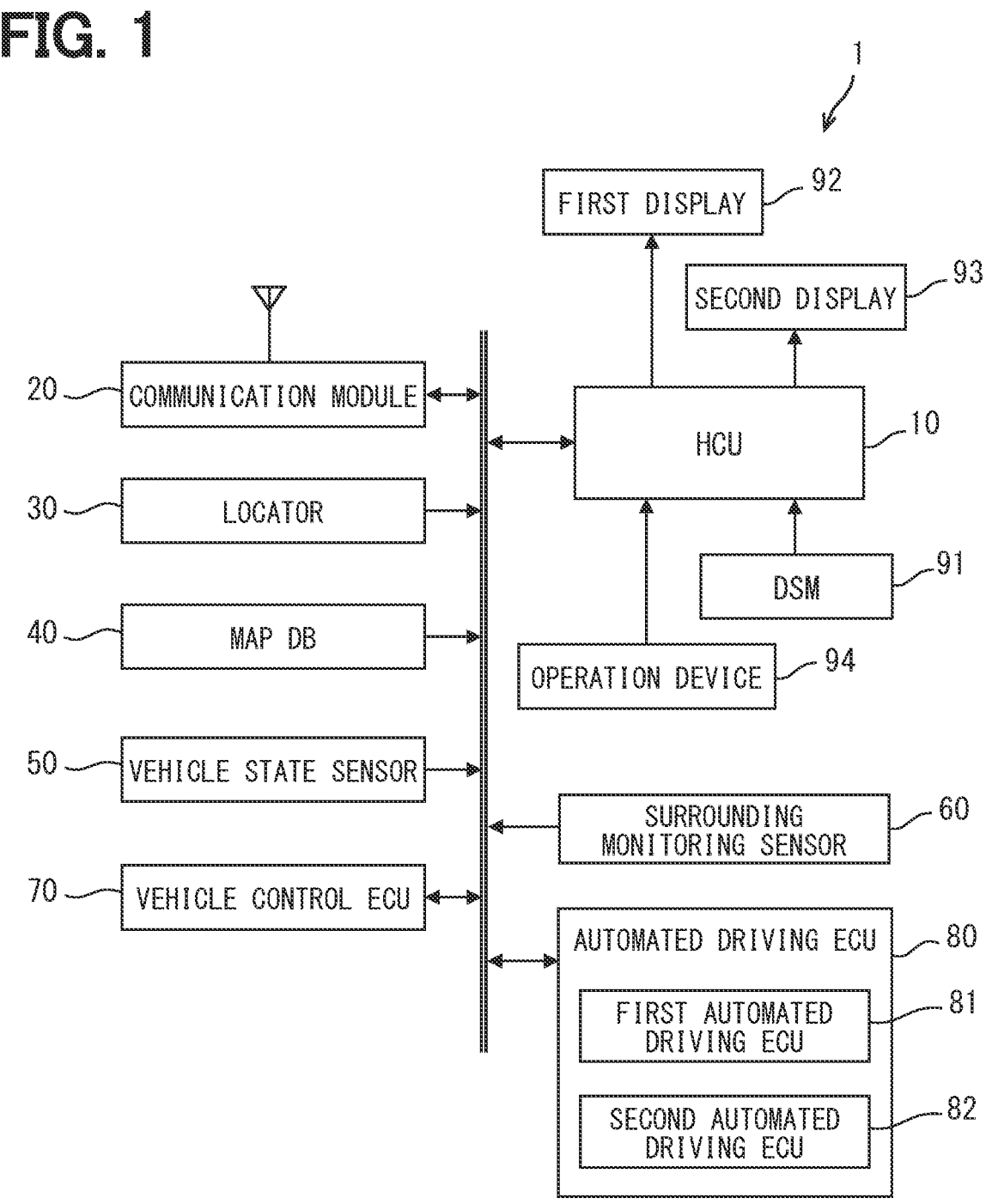
FIG. 1 is a diagram showing an example of a schematic configuration of a vehicle system.

According to an example of the present disclosure, an occupant of a vehicle is notified of a traveling state of a subject vehicle when the vehicle performs automated driving. The vehicle automatically controls acceleration, deceleration, and/or steering of the vehicle in the automated driving.

According to an example of the present disclosure, light emission spots are arranged along a vehicle width direction of an instrument panel of a subject vehicle. A traveling state related to automated driving of the subject vehicle is notified with the light emission mode of the light emission spots. The current automation level of the subject vehicle is presented by changing a light emission reference position of the light emission spot.

The light emission from the light emitting spots arranged in the instrument panel of the vehicle along the vehicle width direction can be easily confirmed not only by a driver but also by a passenger on a front passenger seat. This configuration enables the passenger on the front passenger seat to grasp the same traveling state of the subject vehicle in the automated driving.

There is a demand that a fellow passenger (hereafter simply referred to as a fellow passenger) other than the driver also desires to grasp the traveling state of the subject vehicle in the automated driving. This is because the fellow passenger may feel uneasy about whether an automated driving function of the subject vehicle is operating normally.

However, in order to grasp the traveling state of the subject vehicle in the automated driving, the fellow passenger may be required to memorize in advance a correspondence between the traveling state and the light emission mode of the light emitting spot. In addition, patterns are limited in the light emission mode of the light emission spot. Therefore, it is difficult to forward, to the fellow passenger, a detailed content of a state related to the automated driving (hereinafter referred to as automated driving related state) such as a traveling state of the vehicle in the automated driving.

According to an example of the present disclosure, a vehicle display control device is for a vehicle. The vehicle is configured to perform automated driving. The vehicle display control device comprises a state identification unit configured to identify an automated driving related state, which is at least one of a traveling state of the vehicle related to the automated driving or a state of a driver of the vehicle. The vehicle display control device further comprises a passenger display control unit configured to control display on a second display provided to the vehicle and different from a first display. The first display is provided to the vehicle and exclusive for the driver. The second display is visible to a passenger of the vehicle other than the driver. The passenger display control unit is configured to cause the second display to display a passenger side graphic that indicates the automated driving related state, which is identified by the state identification unit, using at least one of a text and an image.

According to an example of the present disclosure, a vehicle display control method is for a vehicle. The vehicle is configured to perform automated driving. A vehicle display control method includes a state identification process and a passenger display control process to be executed by at least one processor. The vehicle display control method comprises identifying, in the state identification process, an automated driving related state, which is at least one of a traveling state of the vehicle related to the automated driving or a state of a driver of the vehicle. The vehicle display control method further comprises controlling, in the passenger display control process, display on a second display provided to the vehicle and different from a first display. The first display is provided to the vehicle and exclusive for the driver. The second display is visible to a passenger of the vehicle other than the driver. The vehicle display control method further comprises causing, in the passenger display control process, the second display to display a passenger side graphic that indicates the automated driving related state identified in the state identification process using at least one of a text and an image.

This configuration and method causes the second display to display the automated driving related state, which is at least one of the traveling state of the vehicle related to the automated driving and the state of the driver of the vehicle. The second display is provided to the vehicle and different from the first display. The first display is provided to the vehicle and exclusive for the driver. The second display is visible to the passenger of the vehicle other than the driver. The second display is visually recognizable by the passenger and is different from the first display that is exclusive for the driver. Therefore, this configuration facilitates the passenger to recognize the display than the configuration in which the automated driving related state is displayed on the first display exclusive for the driver. The passenger side graphic displayed on the second display indicates the automated driving related state using at least one of a text and an image. Therefore, the configuration enables to display a detailed content of the automated driving related state to enable the fellow passenger to easily grasp the detailed content. The configuration enables the passenger to easily recognize more detailed automated driving related state related to the auto-mated driving of the subject vehicle.

According to an example of the present disclosure, a vehicle display control system of the present disclosure is for a vehicle. The vehicle is configured to perform automated driving. The vehicle display control system comprises a first display provided to the vehicle and exclusive for a driver. The vehicle display control system further comprises a second display provided to the vehicle and different from the first display. The second display is visible to a passenger of the vehicle other than the driver. The vehicle display control system further comprises the vehicle display control device.

The configuration includes the vehicle display control device and therefore enables the passenger to easily recognize more detailed automated driving related state related to the automated driving of the subject vehicle.

The following will describe embodiments of the present disclosure with reference to the accompanying drawings. For convenience of description, the same reference signs are assigned to portions having the same functions as those illustrated in the drawings used in the description so far among the plurality of embodiments, and a description of the same portions may be omitted. The description of other embodiments may be referred to with respect to these portions given the same reference symbols.

First Embodiment

<Schematic Configuration of Vehicle System 1>

The following will describe a first embodiment of the present disclosure with reference to the accompanying drawings. A vehicle system 1 shown in FIG. 1 is used for a vehicle configured to perform automated driving (hereinafter referred to as an automated driving vehicle). As shown in FIG. 1, the vehicle system 1 includes an HCU (Human Machine Interface Control Unit) 10, a communication module 20, a locator 30, a map database (hereinafter referred to as map DB) 40, a vehicle state sensor 50, a surrounding monitoring sensor 60, a vehicle control ECU 70, an auto-mated driving ECU 80, a DSM (Driver Status Monitor) 91, a first display 92, a second display 93, and an operation device 94. The vehicle system 1 corresponds to a vehicle display control system. Although the vehicle using the vehicle system 1 is not necessarily limited to an automobile, hereinafter, an example using the automobile will be described.

The automated vehicle in the first embodiment may be a vehicle capable of automatically driving as described above. The degree of the automated driving (hereinafter, referred to as an automation level) includes multiple levels as defined by, for example, SAE. This automation level is classified into, for example, five levels including level 0 to level 5 as follows.

Level 0 is a level where the driver performs all driving tasks without any intervention of the system. The driving tasks include, for example, steering, acceleration and deceleration, and surrounding monitoring. The level 0 corresponds to so-called manual driving. The level 1 is a level where a system assists the steering or the acceleration and deceleration. The levels 1 corresponds to so-called driving assistance. The level 2 is a level where the system assists the steering and the acceleration and deceleration. The level 2 corresponds to so-called partial driving automation. The levels 1 and 2 are a part of the automated driving.

For example, the automated driving at levels 1 and 2 is automated driving in which a driver has a duty of monitoring related to safe driving (hereinafter simply referred to as a duty of monitoring). The duty of monitoring includes visual monitoring of surroundings. The automated driving at levels 1 and 2 is, in other words, automated driving in which a second task is not permitted. The second task is an action other than a driving operation permitted to the driver, and is a predetermined specific action. The second task is, in other words, a secondary activity, another activity, or the like. The second task must not prevent a driver from responding to a request to takeover the driving from the automated driving system. As an example, viewing of a content such as a video, operation of a smartphone, reading, and eating are assumed as the second task.

The level 3 is a level where the system performs all driving tasks in a certain location, such as a highway, and the driver drives the vehicle in an emergency. In the level 3, the driver must be able to respond quickly when the system requests to takeover the driving. The level 3 corresponds to a conditional automated driving. The level 4 is a level where the system is capable of performing all driving tasks, except under a specific circumstance, such as an unsupported road, an extreme environment, and the like. The level 4 corresponds to a highly automated driving. The level 5 is a level where the system is capable of performing all driving tasks in any situations. The level 5 corresponds to a fully automated driving.

For example, the automated driving at levels 3 to 5 is automated driving in which the driver does not have the duty of monitoring. The automated driving at levels 3 to 5 is, in other words, automated driving in which the second task is permitted. In the present embodiment, switching between the automation level of level 3 or higher and the automation level of level 2 or lower switches the presence or absence of the duty of monitoring. Therefore, when the automation level is switched from the automation level of level 3 or higher to the automation level of level 2 or lower, the driver is required of monitoring related to safe driving. On the other hand, when the automation level of level 2 or higher is switched to the automation level of level 1 or lower, the driver may be required to takeover the driving.

The automated driving vehicle according to the first embodiment may be an automated driving vehicle that is not capable of switching the automation level, and may be an automated driving vehicle that is capable of switching the automation level. A configuration may be employable in which the automation level is switchable within a part of the levels 0 to 5. Hereinafter, an example will be described in which an automated vehicle is capable of switching between automated driving at the automation level 3 or higher, automated driving at the automation level 2 or lower, and manual driving.

The communication module 20 transmits and receives information to and from other vehicles via wireless communications. In other words, the communication module 20 performs vehicle-to-vehicle communications. The communication module 20 may transmit and receive information via wireless communications with a roadside device installed on a roadside. In other words, the communication module 20 may perform road-to-vehicle communications. When performing the road-to-vehicle communications, the communication module 20 may receive information about a surrounding vehicle transmitted from the surrounding vehicle via the roadside device. Further, the communication module 20 may transmit and receive information to and from a center outside the subject vehicle via wireless communications. In other words, the communication module 20 may perform wide area communications.

The locator 30 includes a GNSS (Global Navigation Satellite System) receiver and an inertial sensor. The GNSS receiver receives positioning signals from multiple positioning satellites. The inertial sensor includes, for example, a gyro sensor and an acceleration sensor. The locator 30 combines the positioning signals received by the GNSS receiver with a measurement result of the inertial sensor to sequentially detect the vehicle position (hereinafter, subject vehicle position) of the subject vehicle on which the locator 30 is mounted. The subject vehicle position may be represented by, for example, coordinates of latitude and longitude. The subject vehicle position may be measured by using a travel distance acquired from signals sequentially output from a vehicle speed sensor mounted on the vehicle.

The map DB 40 is a nonvolatile memory and stores map data such as link data, node data, a road shape, a building and the like. The map data may include a three-dimensional map including feature points of the road shape and the building. In a case where a three-dimensional map consisting of the feature points of the road shape and the building is used as map data, the locator 30 may not use the GNSS receiver. For example, the locator 30 may be configured to identify the subject vehicle position by using the three-dimensional map and a LiDAR (Light Detection and Ranging/Laser Imaging Detection and Ranging) that detects feature points of the road shape and the building or the surrounding monitoring sensor 60 such as a surrounding monitoring camera. The three-dimensional map may be generated by REM (Road Experience Management) based on captured images.

The communication module 20 may receive map data distributed from an external server through, for example, wide area communication and may store the data in the map DB 40. In this case, the map DB 40 may be stored in a volatile memory, and the communication module 20 may sequentially acquire the map data of an area corresponding to the subject vehicle position.

The vehicle state sensor 50 is a sensor group for detecting various states of the subject vehicle. The vehicle state sensor 50 includes a vehicle speed sensor for detecting a vehicle speed, a steering sensor for detecting a steering angle, and the like. The vehicle state sensor 50 outputs detected sensing information to the in-vehicle LAN. Note that the sensing information detected by the vehicle state sensor 50 may be output to an in-vehicle LAN via an ECU mounted on the subject vehicle.

The surrounding monitoring sensor 60 monitors a surrounding environment of the subject vehicle. For example, the surrounding monitoring sensor 60 detects an obstacle around the subject vehicle, such as a pedestrian, a moving object like another vehicle, and a stationary object, such as an object on the road. The surrounding monitoring sensor 60 further detects a road surface marking such as a traffic lane marking around the subject vehicle. The surrounding monitoring sensor 60 is a sensor such as a surrounding monitoring camera that captures a predetermined range around the subject vehicle, a millimeter wave radar that transmits a search wave in a predetermined range around the subject vehicle, a sonar, or a LiDAR. The surrounding monitoring camera sequentially outputs, as sensing information, sequentially captured images to the automated driving ECU 80. A sensor that transmits a probe wave such as a sonar, a millimeter wave radar, a LiDAR or the like sequentially outputs, as the sensing information to the automated driving ECU 80, a scanning result based on a received signal acquired as a wave reflected on an obstacle on the road. The sensing information detected by the surrounding monitoring sensor 60 may be outputted to the in-vehicle LAN via the automated driving ECU 80.

The vehicle control ECU 70 is an electronic control device configured to perform a traveling control of the subject vehicle. The traveling control includes an acceleration and deceleration control and/or a steering control. The vehicle control ECU 70 includes a steering ECU that performs the steering control, a power unit control ECU and a brake ECU that perform the acceleration and deceleration control, and the like. The vehicle control ECU 70 is configured to output a control signal to a traveling control device such as an electronic throttle, a brake actuator, and an EPS (Electric Power Steering) motor mounted on the subject vehicle thereby to perform the traveling control.

The automated driving ECU 80 includes, for example, a processor, a memory, an I/O, and a bus that connects those devices, and executes a control program stored in the memory thereby to execute a process related to the automated driving. The memory referred to here is a non-transitory tangible storage medium, and stores programs and data that can be read by a computer. The non-transitory tangible storage medium is a semiconductor memory, a magnetic disk, or the like.

The automated driving ECU 80 includes a first automated driving ECU 81 and a second automated driving ECU 82. The following description is given assuming that each of the first automated driving ECU 81 and the second automated driving ECU 82 includes a processor, a memory, an I/O, and a bus connecting these devices. A configuration may be employable in which a common processor bears the function of the first automatic operation ECU 81 and the second automatic operation ECU 82 by a virtualization technology.

The first automated driving ECU 81 bears the function of the automated driving at level 2 or lower as described above. In other words, the first automated driving ECU 81 enables the automated driving that requires the duty of monitoring. For example, the first automated driving ECU 81 is capable of executing at least one of a longitudinal direction control in a longitudinal direction and a lateral direction control in a lateral direction of the subject vehicle. The longitudinal direction is a direction that coincides with a longitudinal direction of the subject vehicle. The lateral direction is a direction that coincides with a lateral direction of the subject vehicle. The first automated driving ECU 81 executes, as the longitudinal direction control, the acceleration and deceleration control of the subject vehicle. The first automated driving ECU 81 executes, as the lateral direction control, the steering control of the subject vehicle. The first automated driving ECU 81 includes, as functional blocks, a first environment recognition unit, an ACC control unit, an LTA control unit, and the like.

The first environment recognition unit recognizes a driving environment around the subject vehicle based on the sensing information acquired from the surrounding monitoring sensor 60. As an example, the first environment recognition unit recognizes a detailed position of the subject vehicle in a driving lane from information such as left and right lane markings of the driving lane in which the subject vehicle travels. In addition, the first environment recognition unit recognizes a position and a velocity of a vehicle around the subject vehicle. Note that the first environment recognition unit may have the same configuration as the second environment recognition unit described later.

The ACC control unit executes an ACC control (Adaptive Cruise Control) to perform constant-speed traveling of the subject vehicle at a target speed or following travel with respect to the preceding vehicle. The ACC control unit may perform ACC control using the position and the velocity of the vehicle around the subject vehicle recognized by the first environment recognition unit. The ACC control unit may cause the vehicle control ECU 70 to perform the acceleration and deceleration control thereby to perform the ACC control. An LTA control unit executes an LTA (Lane Tracing Assist) control to maintain the subject vehicle to drive within the lane. The LTA control unit may perform the LTA control using the detailed position of the subject vehicle in the driving lane recognized by the first environment recognition unit. The LTA control unit may cause the vehicle control ECU 70 to perform the steering control thereby to perform the LTA control. Note that the ACC control is an example of the longitudinal direction control. The LTA control is an example of the lateral direction control.

The first automated driving ECU 81 performs both the ACC control and the LTA control thereby to realize the level 2 automated driving. The first automated driving ECU 81 may perform either the ACC control or the LTA control thereby to realize the level 1 automated driving.

On the other hand, the second automated driving ECU 82 bears the function of the automated driving at level 3 or higher. In other words, the second automated driving ECU

82 enables the automated driving that does not require the duty of monitoring. The second automated driving ECU 82 includes, as functional blocks, a second environment recognition unit, an action determination unit, a trajectory generation unit, and the like.

The environment recognition unit recognizes the driving environment around the vehicle based on the sensing information, which is acquired from the surrounding monitoring sensor 60, the subject vehicle position, which is acquired from the locator 30, the map data, which is acquired from the map DB 40, the vehicle information, which acquired by the communication module 20, and the like. As an example, the second environment recognition unit uses these pieces of information to generate a virtual space that reproduces an actual driving environment.

The second environment recognition unit determines a manual driving area (hereinafter referred to as an MD area) in a travelling area of the subject vehicle. The second environment recognition unit determines an automated driving area (hereinafter referred to as an AD area) in the travelling area of the subject vehicle. The second environment recognition unit determines an ST section in the AD area. The second environment recognition unit determines a non-ST section in the AD area.

The MD area is an area where the automated driving is prohibited. In other words, the MD area is an area where the driver performs all of the longitudinal control, lateral control and surrounding monitoring of the subject vehicle. For example, the MD area may be an ordinary road.

The AD area is an area where the automated driving is permitted. In other words, the AD area is an area where the subject vehicle is capable of performing at least one of the longitudinal control, the lateral control, and the surrounding monitoring, instead of the driver. For example, the AD area may be a highway or a motorway.

The AD area is classified into a non-ST section, in which the automated driving at level 2 or lower is permitted, and an ST section, in which the automated driving at level 3 or higher is permitted. In the present embodiment, the non-ST section, in which the automated driving at level 1 is permitted, and the non-ST section, in which the automated driving at level 2 is permitted, are not classified. The ST section may be, for example, a traveling section in which a traffic jam occurs (hereinafter, a traffic jam section). Further, the ST section may be, for example, a traveling section in which a high-precision map is prepared. The non-ST section may be a section other than the ST section.

The action determination unit determines an action, which is scheduled for the subject vehicle (hereinafter referred to as a future action), based on a recognition result of the driving environment by the second environment recognition unit. The action determination unit determines a future action for causing the subject vehicle to perform the automated driving. The action determination unit may determine, as the future action, a type of action that the vehicle should take in order to arrive at a destination. This type includes, for example, going straight, turning right, turning left, and changing lanes.

Further, when the action determination unit determines that it is necessary to transfer a driving control right to the driver (i.e., takeover of the driving), the action determination unit generates a takeover request and provides the takeover request to the HCU 10. An example of a case where it is necessary to transfer the driving control right to the driver is when the subject vehicle moves from the AD area to the MD area. In addition, the case is, for example, when the recognition of the driving environment by the second environment recognition unit fails due to sensor loss, communication failure, or the like.

The trajectory generation unit generates the travel trajectory of the subject vehicle in a section, in which the automated driving can be performed, based on the recognition result of the driving environment by the second environment recognition unit and the future action determined by the action determination unit. The travel trajectory includes, for example, a target position of the subject vehicle according to a progress, a target speed at each target position, and the like. The trajectory generation unit sequentially provides the generated travel trajectory, as a control command to be followed by the subject vehicle in the automated driving, to the vehicle control ECU 70.

With the automated driving system including the automated driving ECU 80, level 2 or lower and level 3 or higher equivalent automated driving can be executed in the subject vehicle. Further, for example, the automated driving ECU 80 may be configured to switch the automation level of the automated driving of the subject vehicle as necessary. As an example, the automated driving at Level 3 or higher may be switched to the automated driving at Level 2 or lower, when the subject vehicle moves from the ST section to the non-ST section in the AD area. In addition, the automated driving ECU 80 may be configured to generate a surrounding monitoring request and provide the surrounding monitoring request to the HCU 10, when the automated driving without the duty of monitoring is switched from to the automated driving with the duty of monitoring.

The DSM (Driver status Monitor) 91 includes a near infrared light source and a near infrared camera together with a control unit for controlling these elements, and the like. The DSM 91 is provided to an upper surface of an instrument panel, for example, with the near infrared camera oriented toward the driver's seat of the subject vehicle. The DSM 91 uses a near-infrared camera to capture a face of the driver to which the near-infrared light is emitted from the near-infrared light source. The image captured by the near-infrared camera is subjected to image analysis by the control unit. The control unit detects a state of the driver, such as a level of wakefulness and a driving disabled state, based on a feature amount of the driver extracted by the image analysis of the captured image. The DSM 91 outputs the detected state of the driver to the HCU 10.

The first display 92 is a display provided to the vehicle. The first display 92 is provided so that a display surface is positioned in front of the driver seat of the vehicle. The first display 92 is a display exclusive for the driver. As the first display 92, various displays, such as a liquid crystal display, an organic EL display, and a head-up display (hereinafter referred to as an HUD), can be used. As an example of the first display 92, a meter MID (Multi Information Display) provided on a meter panel is assumable.

The second display 93 is a display provided to the vehicle. The second display 93 is a display, which is different from the first display 92 and is visible for a passenger other than the driver of the vehicle (hereinafter referred to simply as a fellow passenger). The second display 93 may be provided in front of a seat on which the fellow passenger sits. For example, the second display 93 may be configured such that a display surface is provided to a front of a front passenger seat and a rear seat. The front of the rear seat may be a region of a seat back surface of the front seat that is in front of the rear seat. The second display 93 may be provided in front of the rear seat at, for example, a ceiling for multiple passengers on the back seat. As the second display 93, various displays, such as a liquid crystal display, an organic EL display, and an HUD, can be used.

The operation device 94 is an intention input unit that receives an operation made by an occupant of the subject vehicle. The operation device 94 is assumed to receive at least an operation input from a fellow passenger. The operation device 94 may be provided to each of the first display 92 and the second display 93. The operation device 94 may be a touch switch integrated with the display or may be a remote controller.

The HCU 10 is mainly composed of a computer including a processor, a volatile memory, a nonvolatile memory, an I/O, and a bus connecting the devices and is connected with the DSM 91, the first display 92, the second display 93, the operation device 94, and the in-vehicle LAN. The HCU 10 executes a control program stored in the nonvolatile memory, thereby to control indication of the first display 92 and the second display 93. The HCU 10 corresponds to a vehicle display control device. The configuration of the HCU 10 for controlling indication of the first display 92 and the second display 93 will be described in detail below.

<Schematic Configuration of HCU 10>

Figure 2:
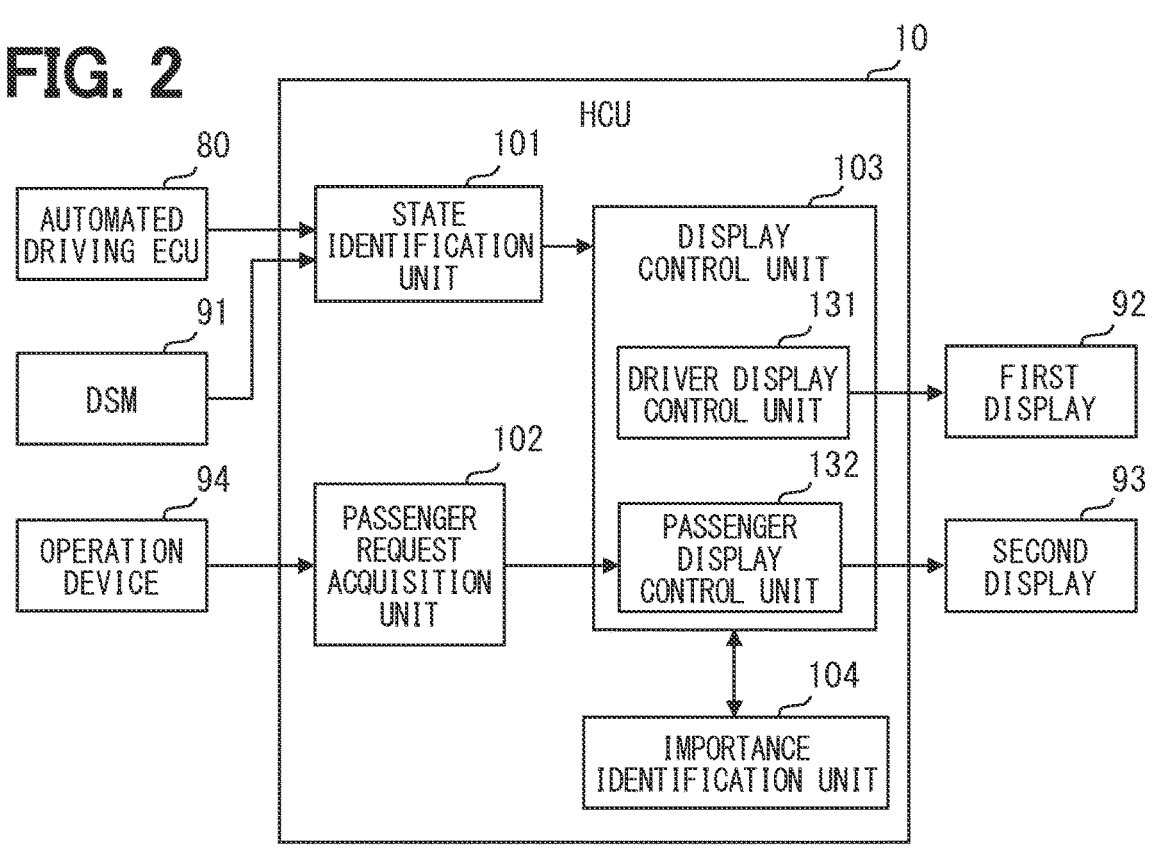
FIG. 2 is a diagram showing an example of a configuration of an HCU.

Here, a schematic configuration of the HCU 10 will be described with reference to FIG. 2. As shown in FIG. 2, the HCU 10 includes, as functional blocks, a state identification unit 101, a passenger request acquisition unit 102, a display control unit 103, and an importance identification unit 104 for controlling indication of the first display 92 and the second display 93. Execution of a process of each functional block of the HCU 10 by the computer corresponds to execution of a vehicle display control method. Some or all of the functions executed by the HCU 10 may be produced by hardware using one or more ICs or the like. Alternatively, some or all of the functions executed by the HCU 10 may be implemented by a combination of execution of software by a processor and a hardware device.

The state identification unit 101 identifies at least one of a traveling state of the subject vehicle and a state of the driver of the subject vehicle (hereinafter referred to as an automated driving related state) related to the automated driving. The process of the state identification unit 101 corresponds to a state identification process. The state identification unit 101 may identify the traveling state of the vehicle from the driving environment recognized by the automated driving ECU 80 and/or a state of implementation of the automated driving by the automated driving ECU 80. As the traveling state of the vehicle, a state of the subject vehicle following another vehicle in the automated driving, change in a behavior of the subject vehicle in the automated driving, a state of the automation level of the subject vehicle, a condition where the driver is required of an action, and the like are assumable.

The state of the subject vehicle following another vehicle in the automated driving (hereinafter referred to as a follow-up state) may include a state of a vehicle, which is a surrounding vehicle of the subject vehicle and other than a target vehicle, which the subject vehicle follows, in addition to a state of the target vehicle. The follow-up state may include a relative position, a relative velocity, and the like relative to the target vehicle, which the subject vehicle follows, and relative to the surrounding vehicle. The state identification unit 101 may identify the follow-up state from, for example, the driving environment recognized by the automated driving ECU 80.

The change in behavior in the automated driving of the subject vehicle (hereinafter, behavior change state) may include acceleration, deceleration, steering, and the like of the subject vehicle. The state identification unit 101 may identify the behavior change state from, for example, a state of implementation of the automated driving by the automated driving ECU 80. The state identification unit 101 desirably identifies only a change in behavior of a certain amount or more, in order to limit identification of the change in behavior that is large to some extent. The state identification unit 101 may identify the behavior change state in future from, in particular, a schedule of acceleration and deceleration and a schedule of steering in the automated driving. The state identification unit 101 may identify the behavior change state that is most recent past from changes in the behavior of the subject vehicle sequentially detected by the vehicle state sensor 50.

The state of the automation level of the subject vehicle (hereinafter referred to as an automated state) may include a current automation level of the vehicle, a change in the automation level, and the like. The state identification unit 101 may identify the automated state from, for example, a state of implementation of the automated driving by the automated driving ECU 80.

The state where the driver of the vehicle is required of an action (hereinafter referred to as an action requested state) may include a state in which the driver is required to takeover the driving, a state in which the driver is required to monitor the surroundings, and the like. The state in which the driver is required to monitor surroundings is, for example, a state in which the automated driving without the duty of monitoring is switched to the automated driving with the duty of monitoring. The state identification unit 101 may identify the action requested state from, for example, a state of implementation of the automated driving by the automated driving ECU 80. The state identification unit 101 is, in particular, provided with the takeover request from the automated driving ECU 80. Therefore, the state identification unit 101 may identify the state in which the driver is requested to takeover the driving. The state identification unit 101 is, in particular, provided with the surrounding monitoring request from the automated driving ECU 80. Therefore, the state identification unit 101 may identify the state in which the driver is provided with the surrounding monitoring request.

In this embodiment, the follow-up state, the behavior change state, the automation state, and the action requested state are shown as examples of the traveling state of the subject vehicle. It is noted that, the state identification unit 101 may be configured to identify only a part of these states. Moreover, the state identification unit 101 may be configured to identify another traveling state of the subject vehicle related to the automated driving.

As the state of the driver of the subject vehicle (hereinafter referred to as a driver state), the degree of wakefulness, the driving disabled state, and the like is assumable. The state identification unit 101 may identify the state of the driver from the state of the driver detected by the DSM 91. The state identification unit 101 may be configured to perform a part of the process to detect the state of the driver executed by the control unit of the DSM 91. In the present embodiment, the driver state includes, for example, the degree of wakefulness and the driving disabled state. It is noted that, the state identification unit 101 may be configured to identify only a part of the states. The state identification unit 101 may be configured to identify, as the driver state, another state.

The passenger request acquisition unit 102 acquires a request from the fellow passenger. The passenger request acquisition unit 102 acquires a request from the fellow passenger to display a passenger side graphic (hereinafter referred to as a passenger side graphic display request). The passenger side graphic is a graphic displayed on the second display 93. Details of the passenger side graphic will be described later. The passenger request acquisition unit 102 may be configured to acquire the passenger side graphic display request, which is output from the operation device 94, when the operation device 94 receives an operation input that requests to display the passenger side graphic.

The display control unit 103 controls indication of the first display 92 and the second display 93. The display control unit 103 includes a driver display control unit 131 and a passenger display control unit 132. The driver display control unit 131 controls indication of the first display 92. The driver display control unit 131 causes the first display 92 to display a graphic showing, by using at least one of a text and an image, the automated driving related state identified by the state identification unit 101. The graphic is a visual representation. A graphic may be an image or may be composed of a combination of visual elements of an image and a text. As an example of an image, a graphic, a symbol, an illustration, a photograph, and the like is assumable. The graphic displayed on the first display 92 is hereinafter referred to as a driver side graphic.

The passenger display control unit 132 controls indication of the second display 93. The process of the passenger display control unit 132 corresponds to a passenger display control process. The passenger display control unit 132 causes the second display 93 to display a graphic showing, by using at least one of a text and an image, the automated driving related state identified by the state identification unit 101. The graphic is a visual representation. The graphic displayed on the second display 93 is hereinafter referred to as a passenger side graphic.

The passenger display control unit 132 causes to display the passenger side graphic including information that is presumed necessary for the fellow passenger. The information presumed necessary for the fellow passenger may be information that is presumed necessary for recognizing the automated driving related state. The passenger display control unit 132 is capable of displaying, for example, the passenger side graphic of the automated driving related state, which is the same as the driver side graphic, which is displayed by the driver display control unit 131. In this case, even though the information about the same automated driving related state, the passenger side graphic is preferably simplified or modified in representation, in order to facilitate the fellow passenger to recognize. That is, the passenger display control unit 132 causes the second display 93 to display the passenger side graphic, which is different from the driver side graphic, about the same automated driving related state identified by the state identification unit 101. In a case where it is presumed that the fellow passenger is capable of easily recognizing, even when the display content is the same as the driver side graphic, the display content of the passenger side graphic may be the same as the display content of the driver side graphic.

The passenger display control unit 132 may display the passenger side graphic, which is about the same follow-up state identified by the state identification unit 101, on the second display 93. The passenger side graphic is different from the driver side graphic displayed on the first display 92 by the driver display control unit 131. The passenger side graphic includes information, which is presumed necessary for the fellow passenger to perform at least one of recognition of the target vehicle, which is a target to be followed which the subject vehicle follows, and recognition that a target inter-vehicle distance is maintained. The passenger side graphic includes simplified information than the driver side graphic. One example of the simplification is to extract a portion of a display content of the driver side graphic. This simplification avoids complexity of the passenger side graphic. The passenger side graphic may be configured to limit the display of the image, which shows another vehicle than the subject vehicle, to an important vehicle, such as an attention target vehicle, such as a cut-in vehicle, and the target to be followed. The driver side graphic may be configured to display an important vehicle, such as the attention target vehicle and the target to be followed.

Figure 3:
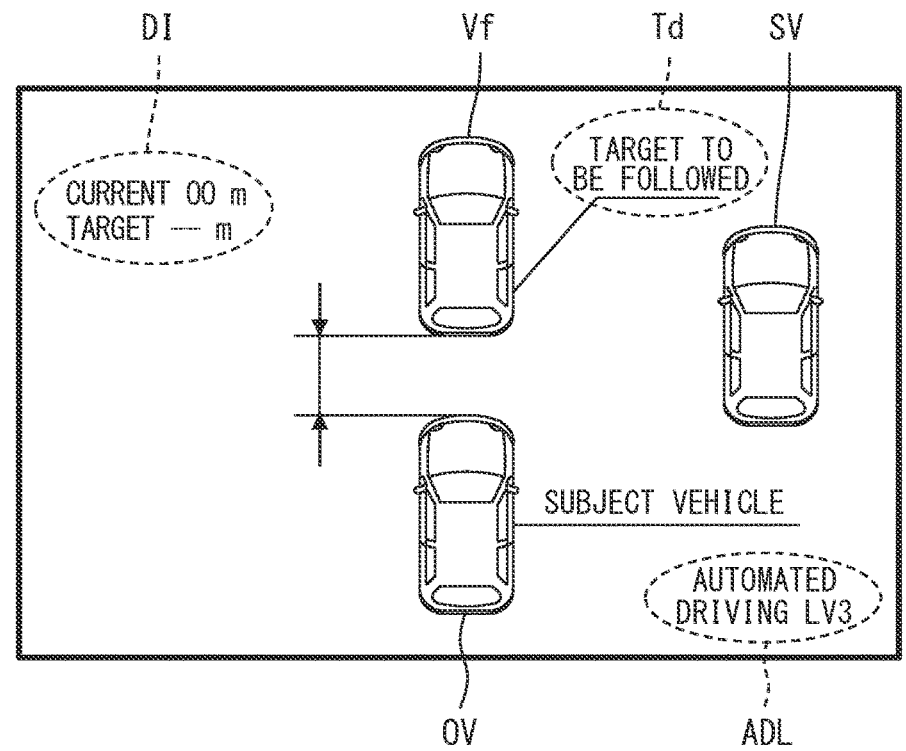
FIG. 3 is an explanatory diagram showing an example of a passenger side graphic in a follow-up state.

Herein, an example of the passenger side graphic about the follow-up state will be described with reference to FIG. 3. In FIG. 3, OV denotes an image representing the subject vehicle. In FIG. 3, Vf denotes an image representing a target to be followed by the subject vehicle. In FIG. 3, SV denotes an image representing a vehicle, which is in the vicinity of the subject vehicle and other than the vehicle to be followed.

The passenger side graphic about the follow-up state desirably includes at least information, which enables to compare a current inter-vehicle distance with the target inter-vehicle distance, and information, which enables to distinguish the vehicle to be followed. The inter-vehicle distance referred to here is an inter-vehicle distance between the subject vehicle OV and the target to be followed Vf. For example, as denoted by DI, a text, which indicates the current inter-vehicle distance and the target inter-vehicle distance, may be displayed as comparable information, which enables to compare the current inter-vehicle distance with the target inter-vehicle distance. For example, as denoted by Vf, a text, which indicates the target to be followed (Td in FIG. 3), may added to the image of the vehicle, which is the target to be followed, and may be displayed. The text is added as information, which enables to distinguish the image of the vehicle to be followed as the target to be followed. It is noted that, as shown in FIG. 3, an image of the subject vehicle (see OV) and a text, which indicates the subject vehicle, may be displayed in order to facilitate recognition of the target vehicle as the target to be followed. As denoted by ADL in FIG. 3, a text indicating the current automation level of the subject vehicle may be displayed. Further, an image of a surrounding vehicle other than the target to be followed may also be displayed in order to facilitate recognition of a positional relationship of the target to be followed with respect to the subject vehicle. The information that enables to distinguish the image of the vehicle to be followed may be provided by differentiating a color of the image of the vehicle to be followed from a color of a surrounding vehicle other than the vehicle to be followed.

In addition to the information shown in FIG. 3, the driver display control unit 131 may display, as the driver side graphic about the follow-up state, a text and an image, which indicate a remaining amount of driving energy, such as a remaining amount of fuel, and instrument information, such as a number of engine revolutions. The driver side graphic further displays information that is less important to the fellow passenger but is more important to the driver.

The driver display control unit 131 may cause the first display 92 to display the driver side graphic showing the behavior change state identified by the state identification unit 101. The passenger display control unit 132 may cause the second display 93 to display the passenger side graphic showing the same behavior change state identified by the state identification unit 101. A text, image, and the like showing the behavior change state of the subject vehicle may be displayed as the driver side graphic and the passenger side graphic showing the behavior change state. The driver side graphic and the passenger side graphic showing the behavior change state may have, for example, the same display content.

The driver display control unit 131 causes the first display 92 to display the driver side graphic showing the automated driving related state identified by the state identification unit 101. The passenger display control unit 132 may cause the second display 93 to display the passenger side graphic showing the same automated state identified by the state identification unit 101.

Figure 4:
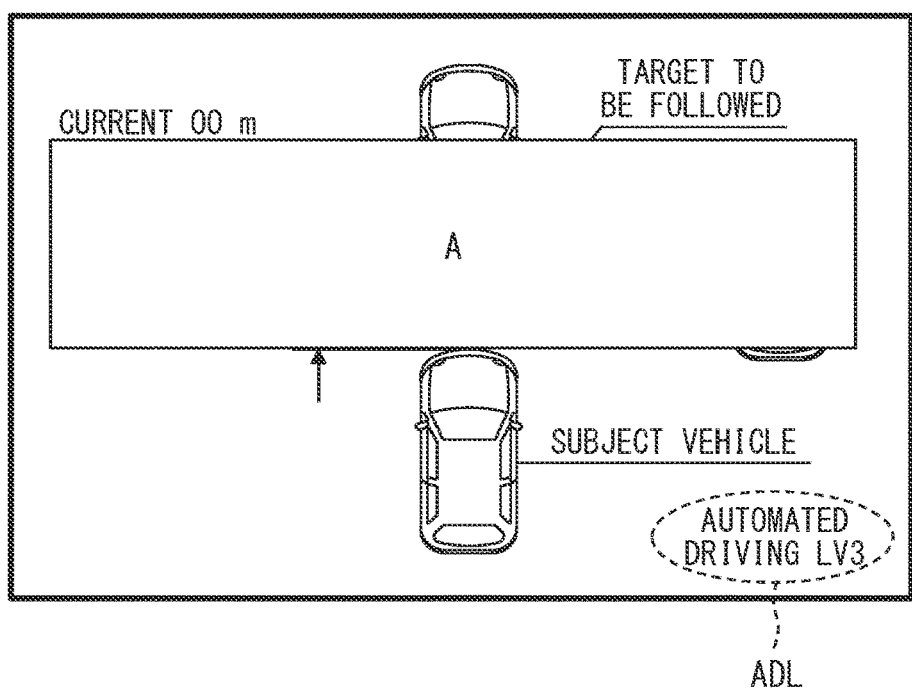
FIG. 4 is an explanatory diagram showing an example of a passenger side graphic showing a change in an automation level.

Herein, an example of the passenger side graphic about the automated state will be described with reference to FIG. 4. The example of FIG. 4 is one example of the passenger side graphic showing change in the automation level of the automation state. FIG. 4 shows an example in which the automation level switches from level 3 to level 2 in the follow-up state. The example of FIG. 4 is similar to the example of FIG. 3 except for that a text denoted by A is displayed.

The passenger side graphic showing the change in the automation level preferably includes information, which explains the automation level to be switched, and information, which explains why the automation level is to be switched. For example, a text such as "Target to be followed cannot be set. Switch to automated driving LV2." may be displayed in A of FIG. 4. As denoted by ADL in FIG. 4, a text indicating the current automation level of the subject vehicle may be displayed.

In a case where the passenger side graphic indicates the current automation level in the automation state, ADL shown in FIG. 3 may be displayed. The driver side graphic and the passenger side graphic showing the automated state may have, for example, the same display content.

The driver display control unit 131 may cause the first display 92 to display the driver side graphic showing the action requested state identified by the state identification unit 101. The passenger display control unit 132 may cause the second display 93 to display the passenger side graphic showing the same action requested state identified by the state identification unit 101. The driver is requested to take an action in the action requested state. Therefore, the driver display control unit 131 may cause the first display 92 to display the driver side graphic, which prompts the driver to take the requested action in the action requested state. To the contrary, in a case where the passenger side graphic has the same display content as the driver side graphic, the fellow passenger may be confused. Therefore, the passenger display control unit 132 may cause the second display 93 to display the passenger side graphic, which includes a modified expression of the driver side graphic.

Figure 5:
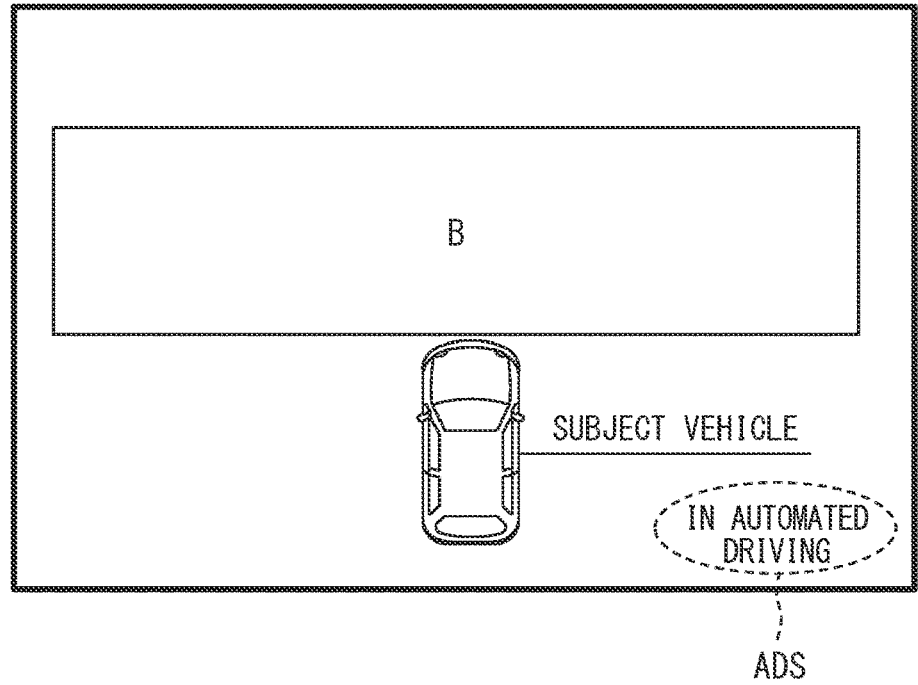
FIG. 5 is an explanatory diagram showing an example of a passenger side graphic showing, among action requested state, a state in which a driver is requested to takeover the driving.

Herein, an example of the passenger side graphic about the action requested state will be described with reference to FIG. 5. The example of FIG. 5 is one example of the passenger side graphic showing, among action requested state, a state in which the driver is requested to takeover the driving. The passenger side graphic, which indicates the state in which the driver is requested to takeover the driving, desirably include information explaining that the driver takes over the driving. For example, a text such as "Currently, driver is taking over driving." may be displayed in B of FIG. 5. As denoted by ADS in FIG. 5, a text indicating whether the automated driving is implemented or not may be displayed with a simplified indication of the current automation level of the subject vehicle. As denoted by ADL in FIG. 3, a text indicating the current automation level of the subject vehicle may be displayed. On the other hand, even in the same action requested state, the driver display control unit 131 may display a text of "Hold on to steering wheel". In the action requested state, the driver display control unit 131 may display a content similarly in a state in which the driver is required of surrounding monitoring.

The driver display control unit 131 may cause the first display 92 to display the driver side graphic showing the driver state identified by the state identification unit 101. The passenger display control unit 132 may cause the second display 93 to display the passenger side graphic showing the same driver state identified by the state identification unit 101. The driver side graphic and the passenger side graphic showing the driver state may have, for example, the same display content. However, when the driver state requires the fellow passenger to support to improve a driver's condition, the content of the passenger side graphic is desirably changed to a content that requests the fellow passenger to take an action. The driver state may be displayed with an icon, a text, or the like. In a case where the passenger side graphic is changed to the content that requests the fellow passenger to take an action, a text requesting confirmation of the driver's condition, and the like may be displayed as the passenger side graphic.

There are many situations in which the fellow passenger feels uneasy about the automated driving of their subject vehicle (hereinafter referred to as an uneasy situation). To this situation, the passenger display control unit 132 causes the second display 93 to display the passenger side graphic indicating the automated driving related state, thereby to enable to reduce this uneasiness of the fellow passenger. Herein, an example of a situation, in which the fellow passenger feels uneasy, and the passenger side graphic will be explained by taking, as an example, the automated driving at level 3 in a traffic jam. In this example, the subject vehicle follows the target to be followed, while maintaining the inter-vehicle distance at the target inter-vehicle distance in the automated driving at level 3 in a traffic jam.

First, it is considered that a situation, in which the subject vehicle shortens the inter-vehicle distance with respect to the target to be followed, corresponds to the uneasy situation. Four reasons thereof are described below. The first reason is that the driver may not have confirmed the front even though the subject vehicle has been switched to the manual driving. The second reason is that it is impossible to determine whether the inter-vehicle distance is according to the target inter-vehicle distance, which is set in the automated driving, whether it is malfunction of the automated driving, or whether it is an error of the driver's operation. The third reason is that there is a possibility that the subject vehicle erroneously recognizes, as the target to be followed, a vehicle other than a closest preceding vehicle. The fourth reason is that there is a possibility that the subject vehicle cannot correctly recognize the nearest preceding vehicle.

To this situation, the passenger display control unit 132 displays the passenger side graphic showing the automated state identified by the state identification unit 101, thereby to enable the fellow passenger to grasp whether the vehicle is in the automated diving or the manual driving. For example, the passenger display control unit 132 causes to display "Currently, driver is driving." in the manual operation, thereby to enable to reduce the uneasiness of the fellow passenger who cannot distinguish between the automated driving and the manual driving. Further, the passenger side graphic showing the change in the automation level as shown in FIG. 4 is displayed, thereby to enable to reduce the uneasiness of the fellow passenger who cannot distinguish between the automated driving and the manual driving. As the passenger side graphic that shows the change in the automation level, a text of "Cannot follow. Switch to manual operation." may be displayed to explain the switch to the manual operation. Further, the passenger side graphic showing the state, in which the driver is required to takeover the driving as shown in FIG. 5, is displayed, thereby to enable to reduce the uneasiness of the fellow passenger who cannot distinguish between the automated driving and the manual driving. Further, the passenger side graphic showing the follow-up state as shown in FIG. 3 is displayed, thereby to enable to reduce the uneasiness of the fellow passenger who cannot determine whether or not the subject vehicle follows the target to be followed normally.

In addition, it is conceivable, as the uneasy situation, a situation in which the subject vehicle changes a lane due to change of the target to be followed. Four reasons thereof are described below. The first reason is that the driver may not have confirmed the front even though the subject vehicle has been switched to the manual driving. The second reason is that it is not possible to determine whether the action was taken as set in consideration of a surrounding vehicle, whether a malfunction occurs in the automated driving, or whether an error occurs in the driving of the driver. The third reason is that there is a possibility that the subject vehicle erroneously recognizes, as the target to be followed, a vehicle other than a closest preceding vehicle. The fourth reason is that there is a possibility that the subject vehicle cannot correctly recognize the nearest preceding vehicle.

To this situation, the passenger display control unit 132 displays the passenger side graphic showing the automated state identified by the state identification unit 101, thereby to enable the fellow passenger to grasp whether the vehicle is in the automated diving or the manual driving. As an example, a display similar to that in the situation, in which the vehicle reduces the inter-vehicle distance from the target to be followed, may be used. Further, in addition to the follow-up state as shown in FIG. 3, the passenger side graphic showing a text that explains the change of the target to be followed is displayed, thereby to enable to reduce the uneasiness of the fellow passenger who cannot determine whether or not the subject vehicle follows the target to be followed normally. As examples of the text that explains the change of the target to be followed, an example of "Target to be followed is to be changed." and "Target to be followed has been changed." are conceivable. When the target to be followed is changed, an image of an arrow, which connects the image of the subject vehicle with the image of the target to be followed, may be displayed in the passenger side graphic, thereby to enable to support grasp of the fellow passenger.

In addition, it is conceivable, as the uneasy situation, a situation in which the target to be followed changes a lane. Three reasons thereof are described below. The first point is that the target to be followed vanishes in front of the subject vehicle, and therefore, the automated driving system may incorrectly recognize that the subject vehicle has exited a traffic jam and may switch to the manual operation. The second reason is that the automated driving system may not be able to recognize a vehicle, which is ahead of the target to be followed that has changed a lane. The third point is that there is a possibility that the subject vehicle may change a lane following the target to be followed that has changed the lane.

To this situation, the passenger display control unit 132 displays the passenger side graphic showing the automated state identified by the state identification unit 101, thereby to enable the fellow passenger to grasp whether the vehicle is in the automated diving or the manual driving. As an example, a display similar to that in the situation, in which the vehicle reduces the inter-vehicle distance from the target to be followed, may be used. Further, in addition to the follow-up state as shown in FIG. 3, the passenger side graphic showing a text that explains the change of the target to be followed is displayed, thereby to enable to reduce the uneasiness of the fellow passenger who cannot determine whether or not the subject vehicle follows the target to be followed normally. As examples of the text that explains the change of the target to be followed, an example of "Target to be followed is to be changed." and "Target to be followed has been changed." are conceivable. When the target to be followed is changed, an image of an arrow, which connects the image of the subject vehicle with the image of the target to be followed, may be displayed in the passenger side graphic, thereby to enable to support grasp of the fellow passenger.

Further, a situation, in which even though traffic jam is resolved, the subject vehicle travels at a low speed or accelerates suddenly as in a traffic jam, is considered to correspond to the uneasy situation. Two reasons thereof are described below. The first reason is that the driver may not perform the driving even though the subject vehicle has been switched to the manual driving. The second reason is that the automated driving system may be malfunctioning to maintain the same target inter-vehicle distance as in a traffic jam, even though the traffic jam has been resolved.

To this situation, the passenger display control unit 132 displays the passenger side graphic showing the automated state identified by the state identification unit 101, thereby to enable the fellow passenger to grasp whether the vehicle is in the automated diving or the manual driving. As an example, a display similar to that in the situation, in which the vehicle reduces the inter-vehicle distance from the target to be followed, may be used. Further, in the passenger side graphic as shown in FIG. 4, a text may be displayed in A, such as "Determination is made that traffic jam has been resolved, switch to manual operation". That is, in a case where takeover of the driving is scheduled, takeover of the driving is implemented, and further, a reason for the takeover of the driving may be displayed.

Further, the display control unit 103 may be configured to differentiate a display timing of the driver side graphic and a display timing of the passenger side graphic according to the automated driving related state identified by the state identification unit 101.

For example, when the state identification unit 101 identifies the action requested state, the driver display control unit 131 causes the first display 92 to display the driver side graphic, which indicates the reason why the driver is required to take an action, and the driver side graphic, which requests the action thereof. The driver side graphic may be displayed continuously in a time-series form or may be integrated and displayed. On the other side, the passenger display control unit 132 causes the second display 93 to display the reason why the driver is required to take an action and the passenger side graphic indicating the state of the driver at a timing delayed from the timing at which the driver side graphic has been displayed on the first display 92. The state of the driver identified by the state identification unit 101 may be used as the state of the driver. In this way, the display timing of the passenger side graphic is delayed more than the display of the driver side graphic, thereby to enable the fellow passenger to confirm whether the driver has reacted to the requested action.

The passenger display control unit 132 may be configured to display the passenger side graphic that requests confirmation of the state of the driver, only when the driver has not reacted to the requested action within a certain period from the display of the driver side graphic. The certain period referred to here can be set arbitrarily. This configuration enables to cause the fellow passenger to improve the state, when the driver does not react to the requested action. When the action requested to the driver is to takeover the driving, the passenger display control unit 132 may detect gripping of the steering wheel of the vehicle or the like, thereby to determine whether or not the driver has reacted to the requested action. When the action required to the driver is surrounding monitoring, the passenger display control unit 132 may detect a line of sight of the driver using the DSM 91, thereby to determine whether or not the driver has responded to the requested action.

When, for example, the state identification unit 101 identifies the driving disabled state, the passenger display control unit 132 may cause the second display 93 to display the driver side graphic showing the state of the driver and the passenger side graphic requesting to confirm the state of the driver. The passenger side graphic may be displayed continuously in a time-series form or may be integrated and displayed. This configuration enables to cause the fellow passenger to improve the state in the driving disabled state. The driving disabled state is, for example, an unconsciousness state, a sleeping state, and the like. When the state identification unit 101 identifies the driving disabled state, the driver display control unit 131 may be configured not to display the driver side graphic about the driving disabled state.

The passenger display control unit 132 may cause to display the passenger side graphic to indicate that the driver has recovered from the driving disabled state, when the driver recovers from the driving disabled state after displaying the passenger side graphic to request confirmation of the driver state. On the other side, the automated driving ECU 80 automatically shifts the subject vehicle to evacuation run, when the driver does not recover from the driving disabled state within a certain period. At this time, the passenger display control unit 132 may display the passenger side graphic to indicate that the subject vehicle automatically shifts to the evacuation run.

For example, when the behavior change state is identified by the state identification unit 101, the driver display control unit 131 and the passenger display control unit 132 may cause the first display 92 and the second display 93 to display the driver side graphic and the passenger side graphic, respectively, at the same timing. This same timing may be substantially the same timing. The behavior change identified to be in the behavior change state is, for example, change in the inter-vehicle distance between the subject vehicle and the target to be followed, automatic lane change of the subject vehicle, change of the target to be followed made by the subject vehicle, and the like. This configuration enables to notify the behavior change, which both the driver and the fellow passenger should prepared for, to the driver and the fellow passenger at the same timing.

The passenger display control unit 132 may be configured to cause the second display 93 to display the passenger side graphic, when the passenger side graphic display request is acquired by the passenger request acquisition unit 102. In this case, the passenger display control unit 132 may be configured not to cause the second display 93 to display the passenger side graphic, when the passenger side graphic display request is not acquired by the passenger request acquisition unit 102. This configuration enables not to cause to display the passenger side graphic, when the fellow passenger does not want to display the passenger side graphic.

Further, the passenger display control unit 132 may be configured to switch whether to cause the second display 93 to display the passenger side graphic or not, according to the importance identified by the importance identification unit 104, even when the passenger side graphic display request is not acquired by the passenger request acquisition unit 102.

The importance identification unit 104 identifies a degree of the importance of the passenger side graphic to the fellow passenger, which is determined according to the automated driving related state identified by the state identification unit 101. As an example, two levels of the importance "high" and importance "low" may be identified. In this case, the passenger display control unit 132 may be configured to display the passenger side graphic on the second display 93, when the importance identification unit 104 identifies the importance "high". On the other side, the passenger display control unit 132 may be configured not to display the passenger side graphic on the second display 93, when the importance identification unit 104 identifies the importance "low".

Examples of the degree of the importance of the passenger side graphic to the fellow passenger, which is determined according to the automated driving related state, are as follows. When the automated driving related state is the action requested state, the importance identification unit 104 may identify the importance level "high". When the automated driving related state is the behavior change state, the importance identification unit 104 may identify the importance level "low". When the behavior change indicated by the behavior change state is greater than or equal to a threshold, which corresponds to sudden acceleration, sudden deceleration, or sudden steering, the importance identification unit 104 may identify the importance "high". In this case, when the behavior change indicated by the behavior change state is less than the threshold, which corresponds to sudden acceleration, sudden deceleration, or sudden steering, the importance identification unit 104 may identify the importance "low". When the automated driving related state is the driving disabled state in the state of the driver, the importance identification unit 104 may identify the importance level "high". When the automated driving related state is, in the driver state, a state, in which the driver does not respond to the action requested in the action requested state, the importance identification unit 104 may identify the importance "high". A determination result of the passenger display control unit 132 may be used for determination of the state, in which the driver does not respond to the action requested in the action requested state.

<Display Control Related Process Executed by HCU 10>

Figure 6:
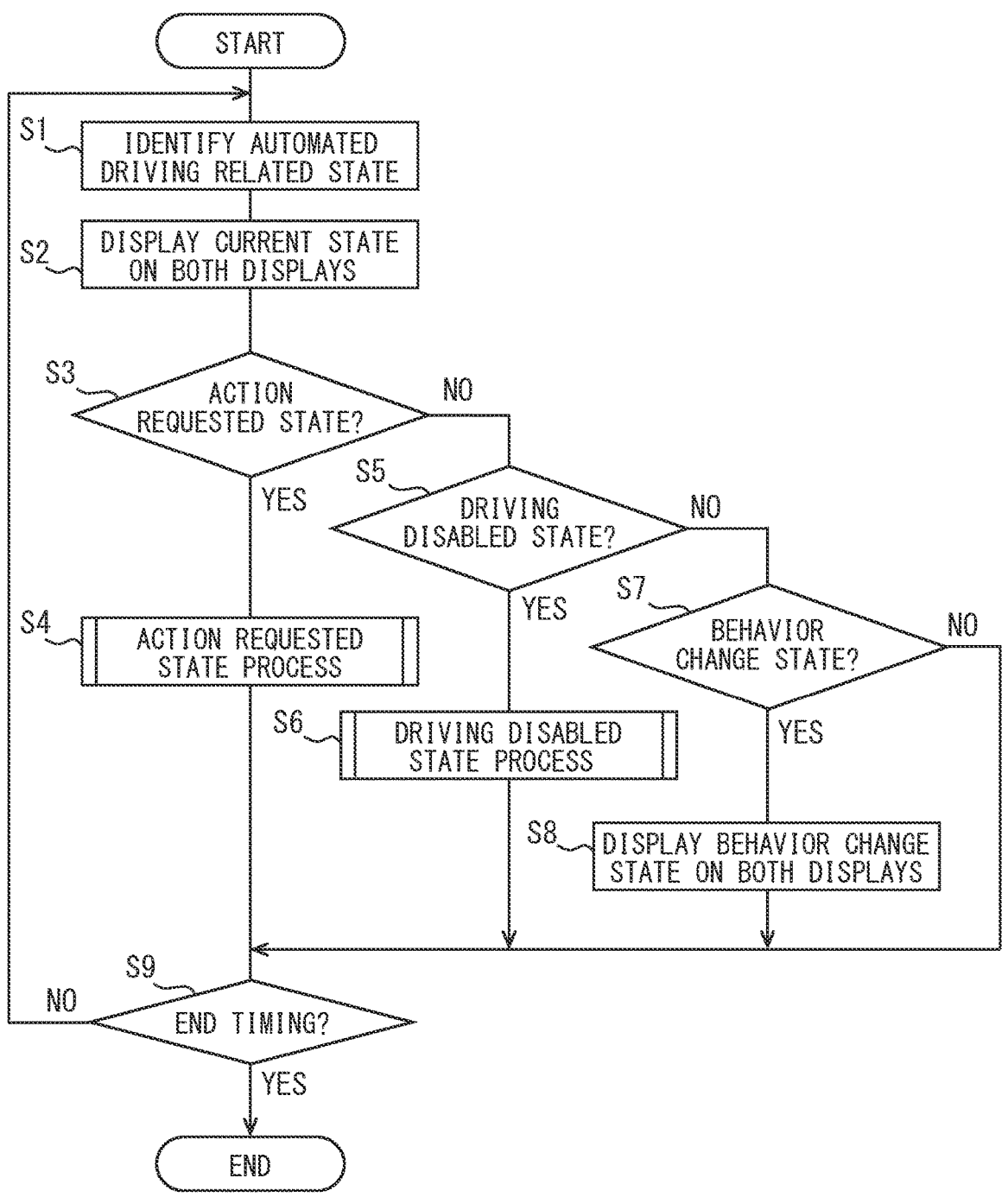
FIG. 6 is a flowchart showing an example of a display control related process executed by the HCU.

As follows, with reference to flowcharts of FIGS. 6 to 8, an example of a process related to the display control of the first display 92 and the second display 93 by the HCU 10 (hereinafter referred to as display control related process) will be described. The process shown in FIG. 6 may be configured to, for example, start when a switch (hereinafter, a power switch) for starting an internal combustion engine or a motor generator of the subject vehicle is turned on.

First, in step S1, the state identification unit 101 identifies the automated driving related state. In step S2, the driver display control unit 131 and the passenger display control unit 132 cause the first display 92 and the second display 93 to respectively display the driver side graphic and the passenger side graphic about the current follow-up state, the current driver state, the current automation state, and the like at the same time.

In step S3, when the automated driving related state identified in S1 is the action request state (YES in S3), the process proceeds to step S4. Alternatively, when the automated driving related state identified in S1 is not the action request state (NO in S3), the process proceeds to step S5.

In step S4, the display control unit 103 performs an action requested state process, and the process proceeds to step S9. Here, one example of a flow of the action requested state process will be described with reference to the flowchart of FIG. 7.

In step S41, the driver display control unit 131 causes the first display 92 to display the driver side graphic that requests the driver to take an action. At this time, the driver display control unit 131 may display the driver side graphic that includes a text indicating the reason why the driver is requested to take the action.

In step S42, the passenger display control unit 132 causes the second display 93 to display the passenger side graphic that indicates the state of the driver. At this time, the passenger display control unit 132 desirably displays the passenger side graphic that includes a text indicating the reason why the driver is requested to take the action.

In step S43, when the driver reacts to the requested action within a certain period after the display of the driver side graphic in S41 (YES in S43), the process proceeds to step S9. Alternatively, when the driver does not react to the requested action within a certain period after the display of the driver side graphic in S41 (NO in S43), the process proceeds to step S44. In step S44, the passenger display control unit 132 causes to display the passenger side graphic that requests confirmation of the state of the driver, and the process proceeds to step S9.

Returning to FIG. 6, in step S5, when the automated driving related state identified in S1 is the driving disabled state (YES in S5), the process proceeds to step S6. Alternatively, when the automated driving related state identified in S1 is not the driving disabled state (NO in S3), the process proceeds to step S7.

In step S6, the display control unit 103 performs a driving disabled state process, and the process proceeds to step S9. Here, one example of a flow of the driving disabled state process will be described with reference to the flowchart of FIG. 8.

In step S61, the passenger display control unit 132 causes the second display 93 to display the passenger side graphic that indicates the state of the driver and that requests to confirm the state of the driver.

In step S62, when the driver recovers from the driving disabled state within a certain period after the passenger side graphic is displayed in S61 (YES in S62), the process proceeds to step S63. Alternatively, when the driver does not recover from the driving disabled state within the certain period after the passenger side graphic is displayed in S61 (NO in S62), the process proceeds to step S64.

In step S63, the passenger display control unit 132 causes the second display 93 to display the passenger side graphic that indicates that the driver has recovered from the driving disabled state, and the process proceeds to step S9. Alternatively, in step S64, the passenger display control unit 132 causes the second display 93 to display the passenger side graphic that indicates that the subject vehicle automatically shifts to evacuation run, and the process proceeds to step S9.

Returning to FIG. 6, in step S7, when the automated driving related state identified in S1 is the behavior change state (YES in S7), the process proceeds to step S8. Alternatively, when the automated driving related state identified in S1 is not the behavior change state (NO in S7), the process proceeds to step S9.

In step S8, the driver display control unit 131 and the passenger display control unit 132 cause the first display 92 and the second display 93 to respectively display the driver side graphic and the passenger side graphic about the behavior change state identified at S1 at the same time.

In S9, when it is an end timing of the display control related process (S9: YES), the display control related process is ended. Alternatively, when it is not the end timing of the display control related process (S9: NO), the process returns to S1 and repeats the process. One example of the end timing of the display control related process is a timing when the power switch is turned off.

Summary of First Embodiment

According to the configuration of the first embodiment, the automated driving related state is displayed on the second display 93, which is different from the first display 92 and is visible to the fellow passenger other than the driver of the vehicle. The second display 93 is visually recognizable by the fellow passenger and is different from the first display 92 that is exclusive for the driver. Therefore, this configuration facilitates the fellow passenger to recognize the display than the configuration in which the automated driving related state is displayed on the first display 92 exclusive for the driver. The passenger side graphic displayed on the second display 93 indicates the automated driving related state using at least one of a text and an image. Therefore, the configuration enables to display a detailed content of the automated driving related state to enable the fellow passenger to easily grasp the detailed content. As a result, the configuration enables the fellow passenger to easily recognize more detailed automated driving related state related to the automated driving of the subject vehicle.

It is noted that, in a case where the same automated driving related state, which is displayed on the first display 92 exclusive for the driver, is displayed on the second display 93, a large volume of unnecessary information for the fellow passenger is provided, and the fellow passenger may hardly recognize the automated driving related state. In this respect, according to the configuration of the first embodiment, even when the same automated driving related state is displayed, the information in the passenger side graphic is simplified by narrowing down to information necessary for the fellow passenger or by modifying the content. Therefore, the configuration enables to reduce a situation, in which the fellow passenger hardly recognizes the automated driving related state due to disturbing information other than necessary information for the fellow passenger. As a result, the configuration enables to facilitate the fellow passenger to recognize the more detailed automated driving related state that is related to the automated driving of the subject vehicle.

Second Embodiment

In the first embodiment, the passenger display control unit 132 causes the second display 93 to display the passenger graphic, regardless of whether or not the fellow passenger is in the subject vehicle. However, it is not necessarily limited to this. For example, the passenger display control unit 132 may be configured to cause the second display 93 not to display the passenger graphic, when the fellow passenger is not in the vehicle (hereinafter, a second embodiment).

In this case, the HCU 10 may be configured to determine whether or not an occupant other than the driver is detected by a seat sensor installed in a seat of the vehicle, thereby to determine whether or not the fellow passenger is in the vehicle. The configuration of the second embodiment enables to reduce a waste caused by displaying the passenger graphic on the second display 93 even when the fellow passenger is not in the vehicle.

Third Embodiment

The passenger display control unit 132 may be configured to, when displaying the state of the surroundings of the subject vehicle as an image, shift a display center of the image in the passenger side graphic from a display center of the image in the driver side graphic in a direction toward the fellow passenger relative to the driver of the vehicle (hereinafter referred to as the third embodiment). This is to display the passenger side graphic in accordance with scenery of the surroundings of the subject vehicle, which varies depending on the position of the fellow passenger in the subject vehicle. The state of the surroundings of the subject vehicle may be an image showing a positional relationship between the subject vehicle and a surrounding vehicle.

Figure 9:
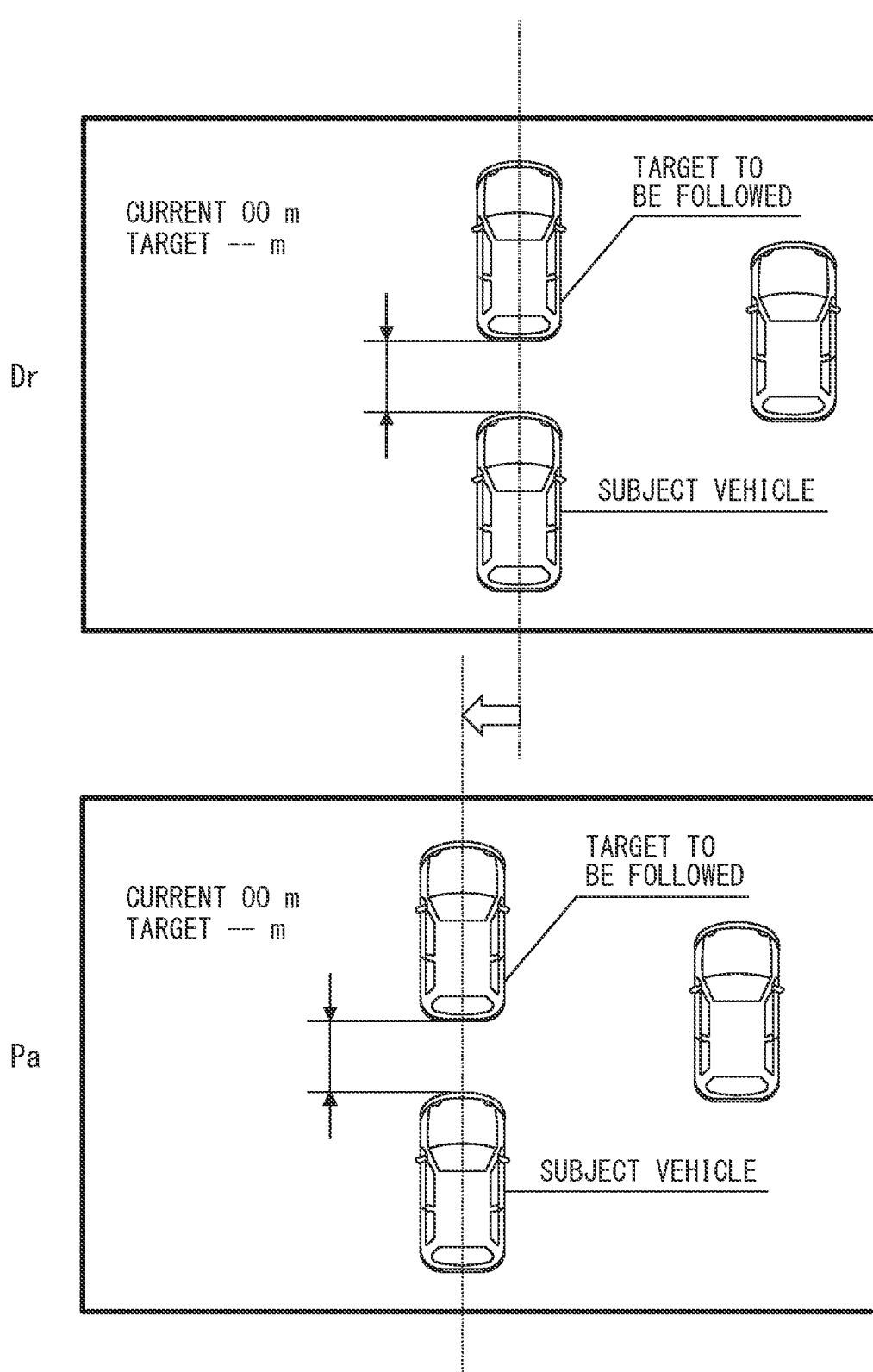
FIG. 9 is an explanatory diagram showing an example in which a position of a display center of a driver side graphic and a position of a display center of a passenger side graphic are differentiated from each other.

Herein, an example, in which the position of the display center of the driver side graphic and the position of the display center of the passenger side graphic are differentiated from each other, will be described with reference to FIG. 9. In FIG. 9, the passenger side graphic, which is displayed on the second display 93 for the fellow passenger in the front passenger seat, will be described as an example. FIG. 9 shows the driver side graphic (see Dr in FIG. 9) and the passenger side graphic (see Pa in FIG. 9) in the same follow-up state. The diagram showing the positional relationship between the subject vehicle and the surrounding vehicle in FIG. 9 corresponds to the image showing the state of the surroundings of the subject vehicle. Herein, a case where the seat of the fellow passenger is on the left side of the seat of the driver will be described as an example.

The seat of the fellow passenger is on the left side of the seat of the driver. Therefore, the direction toward the fellow passenger with respect to the driver of the subject vehicle is on the left side. Therefore, the scenery around the subject vehicle seen from the fellow passenger in the front passenger seat is on the left with respect to the scenery around the subject vehicle seen from the driver. In consideration of this, as shown in FIG. 9, in the passenger side graphic displayed on the second display 93 corresponding to the fellow passenger, the display center of the image showing the surroundings of the subject vehicle may be shown on the left side relative to the display center of the image in the driver side graphic. In a case where the fellow passenger is an occupant in the rear seat, the display center of the image showing the surroundings of the vehicle may be displayed on a rear side relative to the display center of the image in the driver side graphic. In this way, the passenger side graphic is adapted to the scenery of the surroundings of the subject vehicle viewed by the fellow passenger. Thus, the configuration enables the fellow passenger to more easily recognize the automated driving related state.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. The controller and the method thereof described in the present disclosure may be implemented by a special purpose computer which includes a processor programmed to execute one or more functions executed by a computer program. Alternatively, the device and the method thereof described in the present disclosure may be implemented by a special purpose hardware logic circuit. Alternatively, the device and the method thereof described in the present disclosure may be implemented by one or more special purpose computers configured by a combination of a processor executing a computer program and one or more hardware logic circuits. The computer program may also be stored in a computer-readable non-transitory tangible storage medium as instructions to be executed by a computer.

What is claimed is:

1. A vehicle display control device for a vehicle configured to perform automated driving, the vehicle display control device comprising:

a state identification unit configured to identify an automated driving related state, which is at least one of a traveling state of the vehicle related to the automated driving or a state of a driver of the vehicle;

a passenger display control unit configured to control display on a second display provided to the vehicle and different from a first display, the first display being provided to the vehicle and exclusive for the driver, the second display being visible to a passenger of the vehicle other than the driver;

a passenger request acquisition unit configured to acquire a request from the passenger; and a driver display control unit configured to control display on the first display, wherein the passenger display control unit is configured to cause the second display to display a passenger side graphic that indicates the automated driving related state, which is identified by the state identification unit, using at least one of a text and an image, the passenger display control unit is configured to cause the second display not to display the passenger side graphic, when the passenger request acquisition unit does not acquire a request from the passenger to display the passenger side graphic, and cause the second display to display the passenger side graphic, when the passenger request acquisition unit acquires the request from the passenger to display the passenger side graphic, the driver display control unit is configured to cause the first display to display a driver side graphic that indicates the automated driving related state, which is identified by the state identification unit, using at least one of a text and an image, and the passenger display control unit is configured to cause the second display to display the passenger side graphic, which is a portion of a display content extracted from the driver side graphic.

2. The vehicle display control device according to claim 1, wherein the passenger display control unit is configured to cause the second display to display, in addition to the passenger side graphic, which is the portion of the display content extracted from the driver side graphic, a passenger side graphic showing, by using at least one of a text and an image, the automated driving related state.

3. The vehicle display control device according to claim 1, wherein the passenger display control unit is configured to cause the second display to display, as the automated driving related state, at lest one of information, which enables to compare a current inter-vehicle distance with a target inter-vehicle distance, information, which enables to distinguish a vehicle to be followed as a following target, information on automation level of the vehicle, information on whether the automated driving is implemented, and information explaining that the driver takes over the driving.

4. The vehicle display control device according to claim 3, wherein the passenger display control unit is configured to cause the second display to display, as the information, which enables to compare the current inter-vehicle distance with the target inter-vehicle distance, a text, which indicates the current inter-vehicle distance and the target inter-vehicle distance.

* * * * *